(12) United States Patent
Okamoto et al.

(10) Patent No.: US 11,920,974 B2
(45) Date of Patent: Mar. 5, 2024

(54) VIBRATION DISTRIBUTION MEASURING SYSTEM, VIBRATION WAVEFORM ANALYSIS METHOD, VIBRATION WAVEFORM ANALYZING DEVICE, AND ANALYZING PROGRAM

(71) Applicant: Nippon Telegraph and Telephone Corporation, Tokyo (JP)

(72) Inventors: Tatsuya Okamoto, Musashino (JP); Daisuke Iida, Musashino (JP); Kunihiro Toge, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 643 days.

(21) Appl. No.: 15/734,115

(22) PCT Filed: May 23, 2019

(86) PCT No.: PCT/JP2019/020399
§ 371 (c)(1),
(2) Date: Dec. 1, 2020

(87) PCT Pub. No.: WO2019/235232
PCT Pub. Date: Dec. 12, 2019

(65) Prior Publication Data
US 2021/0215532 A1    Jul. 15, 2021

(30) Foreign Application Priority Data
Jun. 4, 2018   (JP) ................................ 2018-106955

(51) Int. Cl.
*G01H 9/00* (2006.01)
*G01D 5/353* (2006.01)

(52) U.S. Cl.
CPC ............. *G01H 9/004* (2013.01); *G01D 5/353* (2013.01)

(58) Field of Classification Search
None
See application file for complete search history.

(56) References Cited

U.S. PATENT DOCUMENTS

2016/0131520 A1* 5/2016 Martin ................... G01H 9/004
73/597

OTHER PUBLICATIONS

D. P. Zhou, et al., *Distributed Dynamic Strain Measurement Using Optical Frequency-Domain Reflectometry*, Appl. Opt., vol. 55, No. 24, 2016, pp. 6735-6739.

(Continued)

*Primary Examiner* — Alvaro E Fortich
*Assistant Examiner* — Carl F. R. Tchatchouang
(74) *Attorney, Agent, or Firm* — Workman Nydegger (57) ABSTRACT

A vibration distribution measurement system includes a frequency sweep light source that outputs frequency sweep light, an optical splitter that splits the frequency sweep light into probe light and local light, an optical mixer that mixes backscattered light from the sensing fiber as signal light with the local light, the backscattered light being obtained by causing the probe light to be incident on the sensing fiber, and an analysis unit that analyzes a beat signal obtained from output light of the optical mixer. The analysis unit estimates a distance offset from a measurement result obtained by measuring a distribution waveform of the signal light by measuring the beat signal at a measurement time sufficiently shorter than a cycle of the vibration of the sensing fiber, and measures a distribution of a vibration at any position by compensating for the distance offset.

8 Claims, 7 Drawing Sheets

(56) References Cited

OTHER PUBLICATIONS

Z. Ding, et. al., *Long-Range OFDR-Based Distributed Vibration Optical Fiber Sensor by Multicharacteristics of Rayleigh Scattering*, IEEE Photon. J., vol. 9, No. 5, 2017, pp. 1-11.
M. Froggatt and J. Moore, *High-Spatial-Resolution Distributed Strain Measurement in Optical Fiber with Rayleigh Scatter*, Appl. Opt., vol. 37, No. 10, 1998, pp. 1735-1740.

* cited by examiner

VIBRATION DISTRIBUTION MEASURING SYSTEM, VIBRATION WAVEFORM ANALYSIS METHOD, VIBRATION WAVEFORM ANALYZING DEVICE, AND ANALYZING PROGRAM

TECHNICAL FIELD

The present invention relates to a vibration distribution measurement system, a vibration waveform analysis method, a vibration waveform analysis device, and an analysis program using optical fiber sensing.

BACKGROUND ART

In the field of optical fiber sensing using an optical fiber as a sensor, various physical quantities of a target to be measured can be determined from transmitted light, reflected light, and backscattered light obtained by causing probe light to pass through the sensing fiber disposed on the target to be measured. In particular, it is possible to measure a distribution of a temporal change of distortion (hereinafter, referred to as dynamic distortion) applied to the sensing fiber due to a mechanical vibration pattern of the target to be measured at different positions in a longitudinal direction of the sensing fiber.

Non Patent Literature 1 (hereinafter, referred to as related art 1) and Non Patent Literature 2 (hereinafter, referred to as related art 2) report such distribution measurement of the dynamic distortion. Non Patent Literature 3 (hereinafter, referred to as related art 3) describes a static distortion distribution measurement technique based on measurement of a spectral shift amount of backscattered light, and the related art 1 is realized by measuring a temporal change in the spectral shift amount of backscattered light by increasing a measurement repetition frequency of the related art 3.

First, the dynamic distortion distribution measurement technique described in the related art 1 is described. The related art 1 is a technique called optical frequency domain reflectometry (OFDR). In this technique, frequency sweep light from a frequency sweep light source is input, as probe light, to the sensing fiber, and a beat between backscattered light returned from the sensing fiber and local light obtained by splitting the frequency sweep light is obtained. A waveform of the backscattered light at each distance, that is, a distribution waveform of the backscattered light is repeatedly measured by using the fact that the beat frequency of the beat signal corresponds to a distance to scatterers. Any interval of the distribution waveform is cut out, and an interval of the sensing fiber corresponding to the cutout interval is used as a distortion sensor interval. The Fourier transform (the square of an absolute value) of the distribution waveform of the distortion sensor interval indicates an optical frequency spectrum (hereinafter, referred to as a spectrum) of the backscattered light in the distortion sensor interval.

The spectrum of the backscattered light is decided depending on reflectance of the scatterers and an arrangement spacing between the scatterers included in the interval of the sensing fiber corresponding to the distortion sensor interval. Such scatterers are intentionally incorporated when the sensing fiber is manufactured, or are produced by natural variations such as a composition of a medium of the fiber.

When such uniform distortion is applied to the distortion sensor interval, the arrangement spacing between the scatterers changes uniformly, and the spectrum of the backscattered light shifts (shifts on a frequency axis) according to the amount of distortion. The amount of distortion can be measured by calculating cross-correlation between a spectrum of a reference criterion and the spectrum in a frequency domain when the distortion is applied and measuring the spectral shift amount. The measurement repetition frequency in the related art 1 is 50 Hz, and measurement of a distribution of a time waveform of the dynamic distortion is realized.

The dynamic distortion distribution measurement described in the related art 2 is also based on similar OFDR. In the related art 2, a loss distribution waveform of the sensing fiber is measured and compared in a non-vibration state and a vibration state. Although only the dynamic distortion application interval and its frequency are measured, the related art 2 does not clearly describe that the magnitude of the dynamic distortion is measured. The loss distribution waveform measured in the OFDR is given by the spectrum of the beat signal between the local light and the backscattered light. While the distance is assigned to the beat frequency, the beat frequency of signal light propagated through the dynamic distortion application interval is modulated at the frequency of the dynamic distortion, and a spectral structure changes. In the loss distribution waveform, distributions of an application location of the dynamic distortion and its frequency are measured by identifying a point at which the spectral structure changes.

CITATION LIST

Non Patent Literature

Non Patent Literature 1: D. P. Zhou, et. al., "Distributed dynamic strain measurement using optical frequency-domain reflectometry", Appl. Opt., vol. 55, no. 24, pp. 6735-6739, 2016.

Non Patent Literature 2: Z. Ding, et. al., "Long-range OFDR-based distributed vibration optical fiber sensor by multicharacteristics of Rayleigh scattering", IEEE Photon. J., vol. 9, no. 5, 2017.

Non Patent Literature 3: M. Froggatt and J. Moore, "High-spatial-resolution distributed strain measurement in optical fiber with Rayleigh scatter", Appl. Opt., vol. 37, no. 10, pp. 1735-1740, 1998.

SUMMARY OF THE INVENTION

Technical Problem

In general, the dynamic distortion that is applied to the sensing fiber and temporally varies causes the backscattered light of the sensing fiber to be frequency-modulated. In the distribution measurement of the dynamic distortion, the backscattered light from an N-th dynamic distortion interval counted from a probe light incident end of the sensing fiber, propagates, as the probe light, through first to (N−1)-th dynamic distortion intervals, is backscattered in the N-th dynamic distortion interval, and propagates through the (N−1)-th to first dynamic distortion intervals. The frequency modulation due to each dynamic distortion is performed twice by performing a round trip of the first to (N−1)-th dynamic distortion intervals. Backscattered light from a plurality of scatterers of the dynamic distortion intervals is finally combined at an input end of the sensing fiber, and is observed as signal light.

In OFDR, the frequency modulation due to the dynamic distortion influences a measurement result such as so-called camera shake to measure a state of the sensing fiber based on the spectrum of the beat frequency between the local light obtained by splitting the frequency sweep light from the frequency sweep light source and the signal light including the backscattered light from the sensing fiber.

In the related art 1, the time waveform of the dynamic distortion is distributionally measured, but the influence of the frequency modulation due to the dynamic distortion is not described, and a condition in which the distribution of the time waveforms of the dynamic distortion can be measured is not clear. In the related art 2, a method capable of identifying the dynamic distortion interval or measuring its frequency by using the fact that the beat frequency spectrum changes due to the frequency modulation is reported, but the magnitude of the dynamic distortion (an amplitude of the vibration pattern) cannot be measured. As described above, the condition and technique in which the time waveform of the dynamic distortion can be distributionally measured is not established.

An embodiment of the present invention have been made in view of the aforementioned problems of the related arts, and an object of the present invention is to provide a device capable of measuring a distribution of a time waveform of dynamic distortion in dynamic distortion distribution measurement based on the OFDR in consideration of influence of the frequency modulation.

Means for Solving the Problem

An embodiment of the present invention includes the following configurations to achieve such an object.

Configuration I

There is provided a vibration distribution measurement system for measuring a distribution of a vibration applied to a sensing fiber. The vibration distribution measurement system includes a frequency sweep light source configured to output frequency sweep light, an optical splitter configured to split the frequency sweep light into probe light and local light, an optical mixer configured to mix backscattered light from the sensing fiber as signal light with the local light, which is obtained by causing the probe light to be incident on the sensing fiber, and an analysis unit configured to analyze a beat signal obtained from output light of the optical mixer. The analysis unit estimates a distance offset from a measurement result obtained from a distribution waveform of the beat signal by measuring the beat signal at a measurement time sufficiently shorter than a cycle of the vibration of the sensing fiber, and measures a distribution of a vibration at any position by compensating for the distance offset.

Configuration II

In the vibration distribution measurement system described in the configuration I, the analysis unit estimates the distance offset due to the vibration by using cross-correlation between the distribution waveform and a reference waveform, and corrects a distance of a distortion measurement interval.

Configuration III

In the vibration distribution measurement system described in the configuration II, a distribution waveform of the sensing fiber in a vibration state is used as the reference waveform for a vibration having a cycle longer than a frequency sweep time of the frequency sweep light.

Configuration IV

There is provided a vibration waveform analysis method of, by a computer, analyzing a waveform of a vibration applied to a sensing fiber. The vibration waveform analysis method includes analyzing a distribution waveform of a beat signal obtained by mixing backscattered light from the sensing fiber as signal light, with local light, the backscattered light being obtained by causing probe light to be incident on the sensing fiber, and the probe light and the local light are obtained by splitting the frequency sweep light. The vibration waveform analysis method includes estimating a distance offset due to a vibration by using cross-correlation between the distribution waveform and a reference waveform, and correcting a distance to a vibration measurement interval, and obtaining the cross-correlation between a spectrum of the distribution waveform at a measurement time and a spectrum of the reference waveform, calculating a spectral shift at the measurement time, and obtaining the waveform of the vibration.

Configuration V

There is provided a vibration waveform analysis device for analyzing a waveform of a vibration applied to a sensing fiber. The vibration waveform analysis device analyzes a distribution waveform of a beat signal obtained by mixing backscattered light from the sensing fiber as signal light with local light, the backscattered light being obtained by causing probe light to be incident on the sensing fiber, and the probe light and the local light are obtained by splitting the frequency sweep light. The device includes a unit configured to estimate a distance offset due to a vibration by using cross-correlation between the distribution waveform and a reference waveform, and correct a distance to a vibration measurement interval, and a unit configured to obtain the cross-correlation between a spectrum of the distribution waveform at a measurement time and a spectrum of the reference waveform, calculate a spectral shift at the measurement time, and obtain the waveform of the vibration.

Configuration VI

There is provided an analysis program causing a computer to execute the vibration waveform analysis method according to the configuration IV.

Effects of the Invention

As described above, according to the embodiment of the present invention, it is possible to provide the device capable of measuring the distribution of the time waveform of the dynamic distortion in consideration of the influence of the frequency modulation in the dynamic distortion distribution measurement based on the OFDR in view of the aforementioned problems in the related art.

DESCRIPTION OF EMBODIMENTS

Hereinafter, an embodiment of the present invention will be described in detail with reference to the drawings.

Configuration of Measurement System

Figure 1:
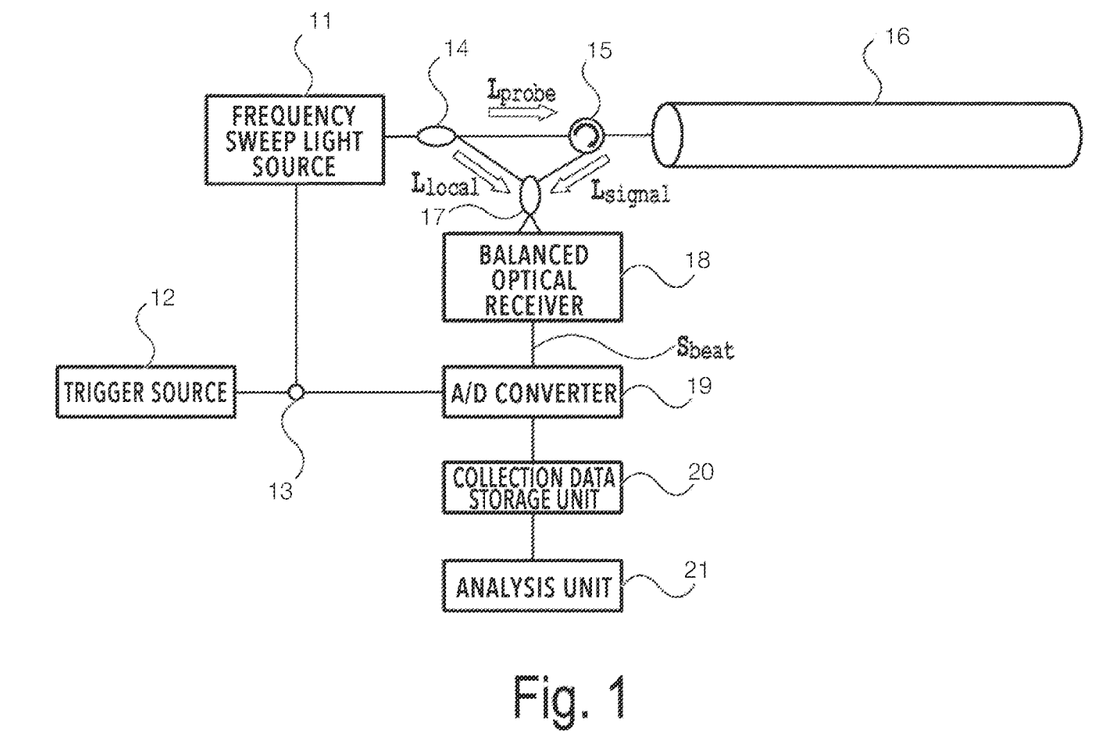
FIG. 1 is a configuration diagram illustrating a vibration distribution measurement system according to an embodiment of the present invention.

FIG. 1 is a diagram illustrating an example of a vibration distribution measurement system (including a vibration waveform analysis device) according to the embodiment of the present invention. In FIG. 1, a frequency sweep light source 11, a trigger source 12, a trigger signal splitter 13, an optical splitter 14, an optical circulator 15, a sensing fiber 16, an optical mixer 17, a balanced optical receiver 18, an A/D converter 19, a collection data storage unit 20, and an analysis unit 21.

The frequency sweep light source 11 is, for example, a laser capable of sweeping a frequency at a high speed. The frequency sweep light source receives a trigger signal from the trigger source 12, and repeatedly outputs frequency sweep light at a predetermined sweep cycle. The frequency sweep light is split into two light rays by the optical splitter 14. One light ray is probe light Lprobe to be supplied to the optical circulator 15, and the other light ray is local light Llocal to be supplied to the optical mixer 17.

The probe light Lprobe is incident on the sensing fiber 16 via the optical circulator 15 which is a directional coupling element. The probe light is backscattered by scatterers within the sensing fiber 16, and returns to the incident side. Signal light Lsignal obtained by overlapping backscattered light rays Lbs from positions of the sensing fiber 16 is output from the sensing fiber 16, and propagates to the optical mixer 17 via the optical circulator 15. The signal light Lsignal is mixed with the local light Llocal from the optical splitter 14 by the optical mixer 17, and a beat signal Sbeat is output as an electrical signal by the balanced optical receiver 18 which is an optical receiver. The beat signal Sbeat is sampled by the A/D converter 19 that shares the trigger source 12 with the frequency sweep light source 11, and is measured as a digital signal.

The beat signal at each measurement time is stored in the collection data storage unit 20, and is analyzed by the analysis unit 21 corresponding to the vibration waveform analysis device. A vibration distribution is measured, and a vibration waveform is analyzed. In the system including the measurement device described in FIG. 1, a backscattered light spectrum in any interval of the sensing fiber is measured, and the vibration distribution and the vibration waveform are measured and analyzed.

Model of Assumed Sensing Fiber

Figure 2:
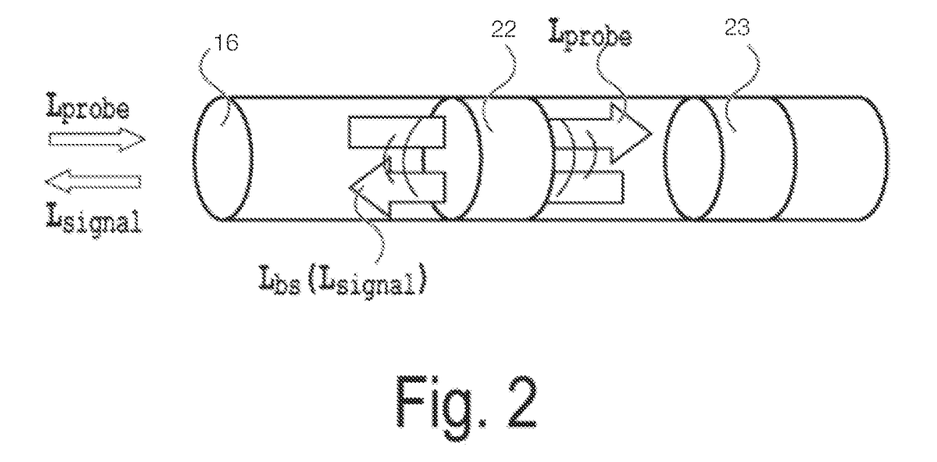
FIG. 2 is a diagram illustrating a model of a sensing fiber assumed in the measurement system according to the embodiment of the present invention.

FIG. 2 is a diagram of a model illustrating a situation of the sensing fiber 16 assumed in the measurement system of FIG. 1. FIG. 2 illustrates a situation in which the probe light Lprobe incident from the measurement system at a left end (not illustrated) propagates through a first dynamic distortion interval 22 of the sensing fiber 6, is backscattered by the scatterers constituting a second dynamic distortion interval 23, propagates through the first dynamic distortion interval 22 again, returns to an input end, and is output as the signal light Lsignal.

As described above, such scatterers may be intentionally incorporated when the sensing fiber is manufactured, or may be produced by natural variations such as a composition of a medium of a fiber.

Due to a mechanical vibration pattern of the first dynamic distortion interval 22, a phase modulation of the signal light Lsignal to be output is performed as will be described below.

Example of Phase Modulation Due to Vibration Pattern

Figure 3:
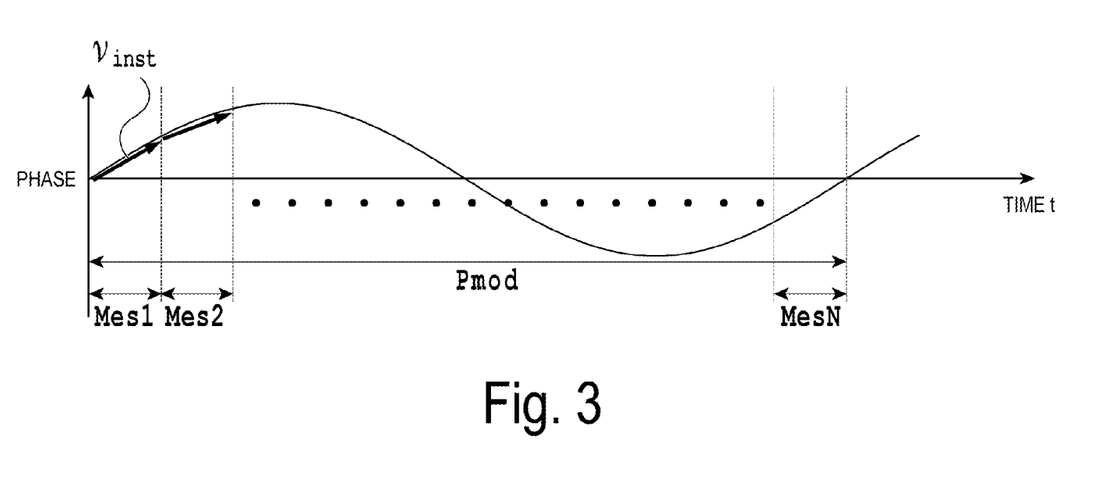
FIG. 3 is a diagram illustrating an example of a phase modulation due to a vibration pattern caused in a first dynamic distortion interval of FIG. 2.

FIG. 3 is a diagram illustrating an example of a phase modulation waveform due to the mechanical vibration pattern caused in the first dynamic distortion interval 22 of FIG. 2. FIG. 3 illustrates a time interval for one cycle Pmod of the phase modulation waveform generated due to the mechanical vibration pattern of the first dynamic distortion interval 22. In the time interval of Pmod, N number of beat signal measurements Mes1 to MesN are performed, and each measurement period is a maximum of one sweep cycle of the frequency sweep light.

When a round-trip time in which the probe light Lprobe propagates through the first dynamic distortion interval 22, is backscattered by the scatterers constituting the second dynamic distortion interval 23, and propagates through the first dynamic distortion interval 22 again is sufficiently shorter than the cycle Pmod of the phase modulation, a phase modulation waveform on an outward path and a phase modulation waveform on a return path are regarded as being identical. Thus, a phase modulation amount of the light propagating on the outward and return paths is twice a phase modulation amount on the outward path. An electric field waveform $E_{signal}(t)$ of the signal light Lsignal propagated on the outward and return paths for one measurement is expressed by the following Equation (1).

Math. 1

$$E_{signal}(t) \propto \exp\left[j2\pi\left(v_0 + \frac{1}{2}\gamma t\right)t\right] \cdot \exp[j\phi(t)] \qquad \text{Equation (1)}$$

Where, $v_0$ indicates an initial frequency in frequency sweep, $\gamma$ indicates a frequency sweep rate, and $\varphi(t)$ indicates the phase modulation waveform of the light propagated on the outward and return paths. An instantaneous frequency $v_{inst.}(t)$ of the electric field waveform expressed by Equation (1) is expressed by the following Equation (2).

Math. 2

$$v_{inst.}(t) = v_0 + \gamma t + \frac{1}{2\pi}\frac{d\phi(t)}{dt} \qquad \text{Equation (2)}$$

A third term on a right side in Equation (2) is the frequency modulation due to the dynamic distortion. As illustrated in FIG. 3, when a time (a time interval of the "first measurement Mes1" or the "second measurement Mes2" of FIG. 3) at which the beat signal between the local light and the signal light is measured is sufficiently shorter than a time (a time interval of the "cycle Pmod of the phase modulation" of FIG. 3) of the phase modulation having a minimum cycle among the frequency modulations (phase modulations) caused by a plurality of dynamic distortions applied to the sensing fiber, the phase modulation due to the dynamic distortion can approximate a linear phase modulation. That is, the phase modulation is a frequency modulation having a constant frequency modulation amount (corresponding to a slope of an arrow of the "instantaneous frequency $v_{inst.}$" of FIG. 3). Accordingly, Equation (2) is expressed as an approximate expression as in the following Equation (3).

Math. 3

$$v_{inst.}(t) = v_0 + \gamma t + \frac{1}{2\pi}\frac{d\phi(t)}{dt} \approx v_0 + \gamma t + v_{offset} \quad \text{Equation (3)}$$

Where, $v_{offset}$ indicates a frequency offset given to the signal light as a linearly approximated phase modulation. In OFDR, the beat signal between the local light and the signal light is measured, and the beat frequency of the beat signal Sbeat is assigned to the distance. The beat frequency $f_{beat}$ between the signal light having the frequency offset given by Equation (3) and the local light becomes Equation (4).

Math. 4

$$f_{beat} = \gamma\frac{2z}{c} - v_{offset} = \frac{2\gamma}{c}(z - z_{offset}), \quad \text{Equation (4)}$$
$$z_{offset} = \frac{c}{2\gamma}v_{offset}$$

Where, z indicates the distance, c indicates a speed of light in the fiber, 2z/c indicates a delay time between the signal light and the local light, and $z_{offset}$ indicates a distance offset due to the frequency offset $v_{offset}$.

Influence of Frequency Modulation

Figure 4:
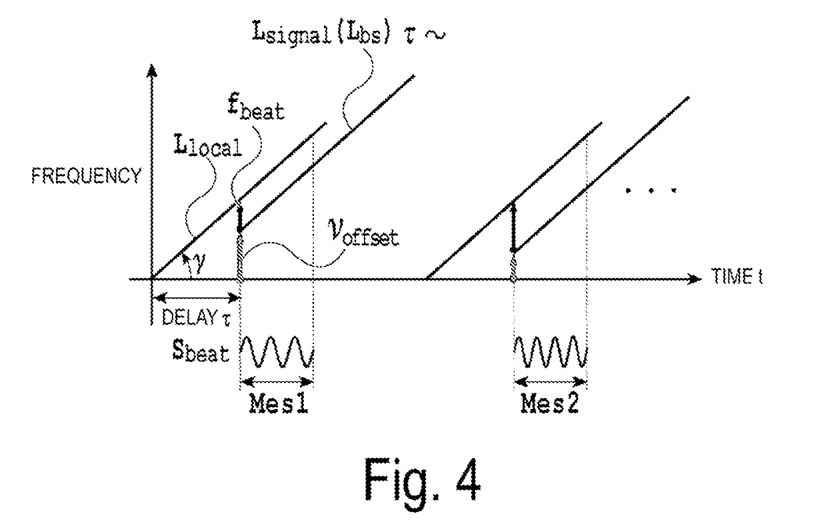
FIG. 4 is a diagram for describing, in a time domain, influence of a frequency modulation according to embodiment of the present invention.
Figure 5:
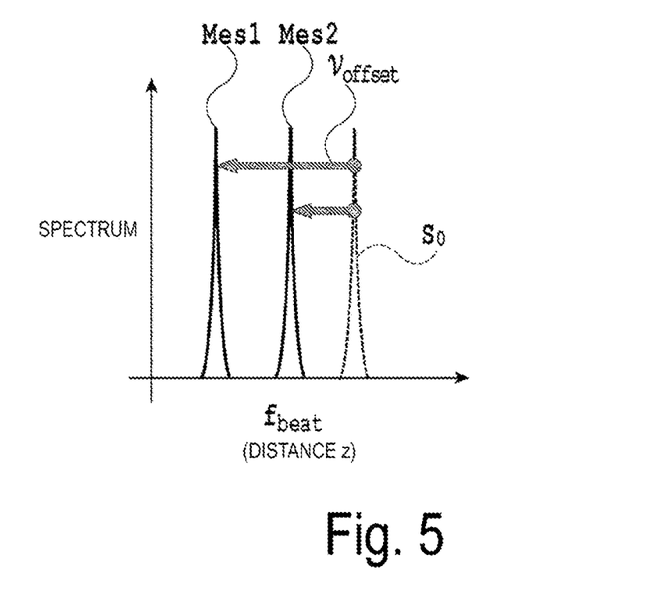
FIG. 5 is a diagram for describing, in a beat frequency domain, influence of the frequency modulation according to the embodiment of the present invention.

FIGS. 4 and 5 are diagrams for describing the influence of the frequency modulation according to the embodiment of the present invention. FIG. 4 is a diagram illustrating, as a change in frequency, the influence of the frequency modulation in a time domain, and FIG. 5 is a diagram illustrating, as a spectral change, the influence of the frequency modulation in a beat frequency domain.

FIG. 4 illustrates the local light Llocal and the signal light Lsignal (the backscattered light Lbs) in two measurements Mes1 and Mes2 and a scene of a temporal change in the beat frequency $f_{beat}$ of the beat signal Sbeat between these signals. As illustrated in FIG. 4, the beat frequency $f_{beat}$ of the beat signal Sbeat between the signal light Lsignal (backscattered light Lbs) and the local light Llocal at a given delay τ fluctuates for each measurement by the frequency offset $v_{offset}$.

In other words, as illustrated in FIG. 5, a distance offset $z_{offset}$ assigned by the frequency offset $v_{offset}$ to a peak position of a spectrum S0 when there is no frequency offset changes for each measurement, and thus, a distance to a distortion sensor to be measured fluctuates in the measurement. Although a temporal change in the spectrum of the distortion sensor at any distance is measured in the dynamic distortion distribution measurement using the OFDR of the related art 1, the distance to the distortion sensor to be measured changes for each measurement by the distance offset $z_{offset}$ due to the dynamic distortion as given by Equation (4), and thus, measurement accuracy does not increase.

Compensation for Frequency Offset

Figure 6:
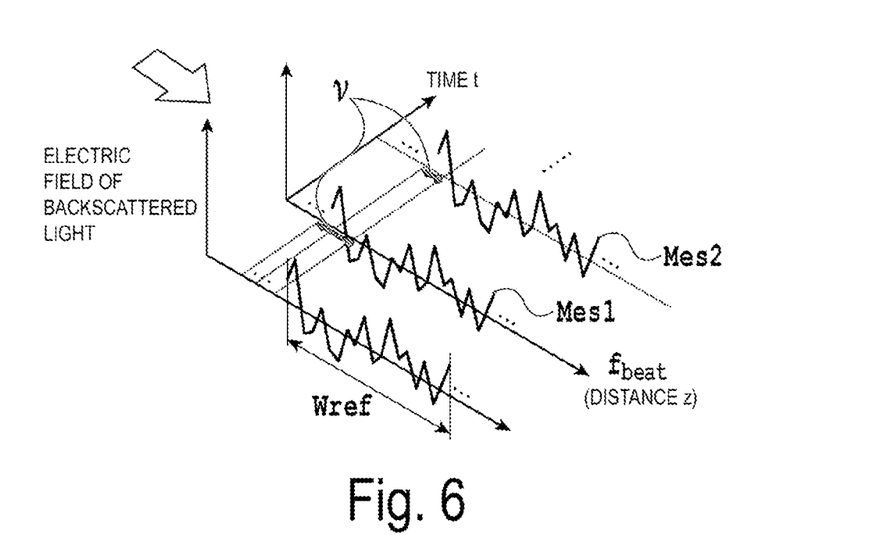
FIG. 6 is a diagram for describing a measurement of a distribution waveform of backscattered light in compensation for a frequency offset according to the embodiment of the present invention.
Figure 7:
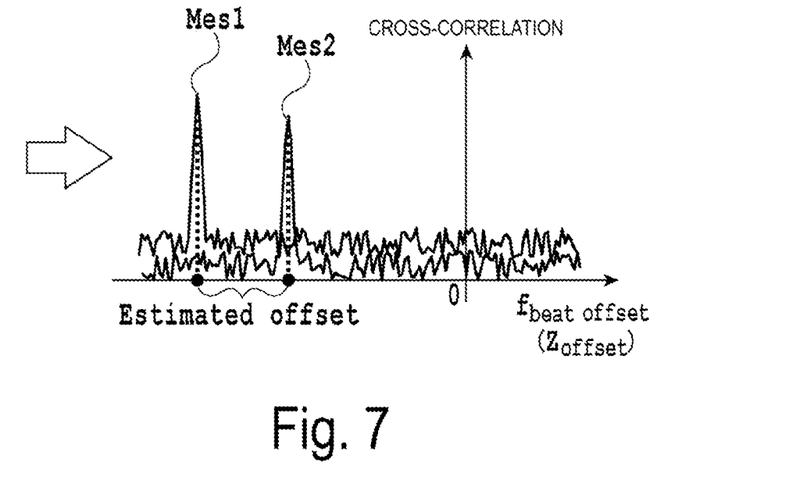
FIG. 7 is a diagram for describing estimation of a beat frequency offset in compensation for the frequency offset according to the embodiment of the present invention.

In the embodiment of the present invention, the distance offset is estimated for each measurement by utilizing cross-correlation with a reference waveform to continue to accurately measure the distortion sensor of which the distance changes for each measurement as illustrated in diagrams of compensation for frequency offsets of FIGS. 6 and 7.

That is, first, one of the distribution waveforms of the backscattered light of the distortion sensor to be measured in a vibration state is a reference waveform Wref as illustrated in the diagram of the measurement of the distribution waveform of the backscattered light of FIG. 6. Subsequently, the cross-correlation between the distribution waveform of the backscattered light obtained at each measurement time (Mes1, Mes2) and the reference waveform Wref is calculated. The beat frequency offset (distance offset $z_{offset}$) that gives a correlation peak of the cross-correlation in each measurement measured from an origin O is estimated as illustrated in the diagram of the estimation of the beat frequency offset of FIG. 7.

In the embodiment of the present invention, when the waveform is measured in a state in which the signal measurement time is set to be sufficiently shorter than the minimum cycle of the dynamic distortion applied to the sensing fiber, even the waveform in the vibration state can be used as the reference waveform. For example, the distribution waveform of the first measurement result may be used as the reference waveform. The origin O of FIG. 7 corresponds to a peak of the cross-correlation with the reference waveform Wref of the reference waveform Wref, that is, autocorrelation.

The distance to the distortion sensor to be measured can be corrected for each measurement by adding the distance offset estimated for each measurement to the distance measured in the reference waveform. The backscattered light spectrum of the distortion sensor is analyzed at the corrected distance. The temporal change in the backscattered light spectrum of the distortion sensor to be measured can be measured with high accuracy by estimating the distance offset by the cross-correlation at each measurement time and analyzing the backscattered light spectrum of the distortion sensor at the corrected distance.

Ultimately, a spectral shift amount between the backscattered light spectrum as the reference criterion obtained from the Fourier transform of the reference waveform and the backscattered light spectrum obtained from the Fourier transform of the distribution waveform for each measurement time is calculated by the cross-correlation in the frequency domain between both spectra. A time waveform of the dynamic distortion can be obtained by setting the shift amount of the distance corresponding to the obtained spectral shift amount to be a displacement of the vibration at the measurement time. (Step 9-7 of FIG. 9 to be described below)

Vibration Distribution Measurement System

As described above, there is provided a vibration distribution measurement system that measures a distribution of a vibration applied to a sensing fiber. The vibration distribution measurement system includes a frequency sweep light source that outputs frequency sweep light, an optical splitter that splits the frequency sweep light into two light rays of probe light and local light, an optical mixer that mixes backscattered light from the sensing fiber, which is obtained by causing the probe light to be incident on the sensing fiber and is used as signal light, with the local light, and an analysis unit that analyzes a beat signal obtained from output light of the optical mixer. The analysis unit estimates a distance offset from a measurement result obtained by measuring a distribution waveform of the beat signal by measuring the beat signal at a measurement time sufficiently shorter than a cycle of the vibration of the sensing fiber, and measures a distribution of a vibration at any position by compensating for the distance offset.

In this case, in the vibration distribution measurement system, the analysis unit estimates the distance offset due to the vibration by using cross-correlation between the distribution waveform and a reference waveform, and corrects a distance of a distortion measurement interval. In the vibration distribution measurement system, a distribution waveform of the sensing fiber in a vibration state is used as the reference waveform for a vibration having a cycle longer than a frequency sweep time of the frequency sweep light.

Analysis Method

Figure 8:
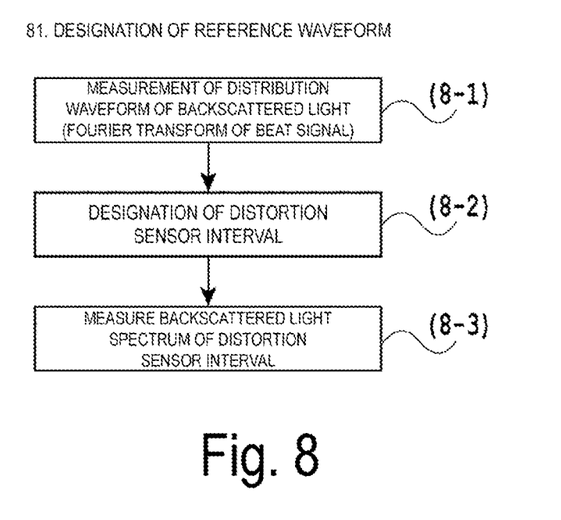
FIG. 8 is a flowchart illustrating a step of designating a reference waveform in an analysis method according to the embodiment of the present invention.
Figure 9:
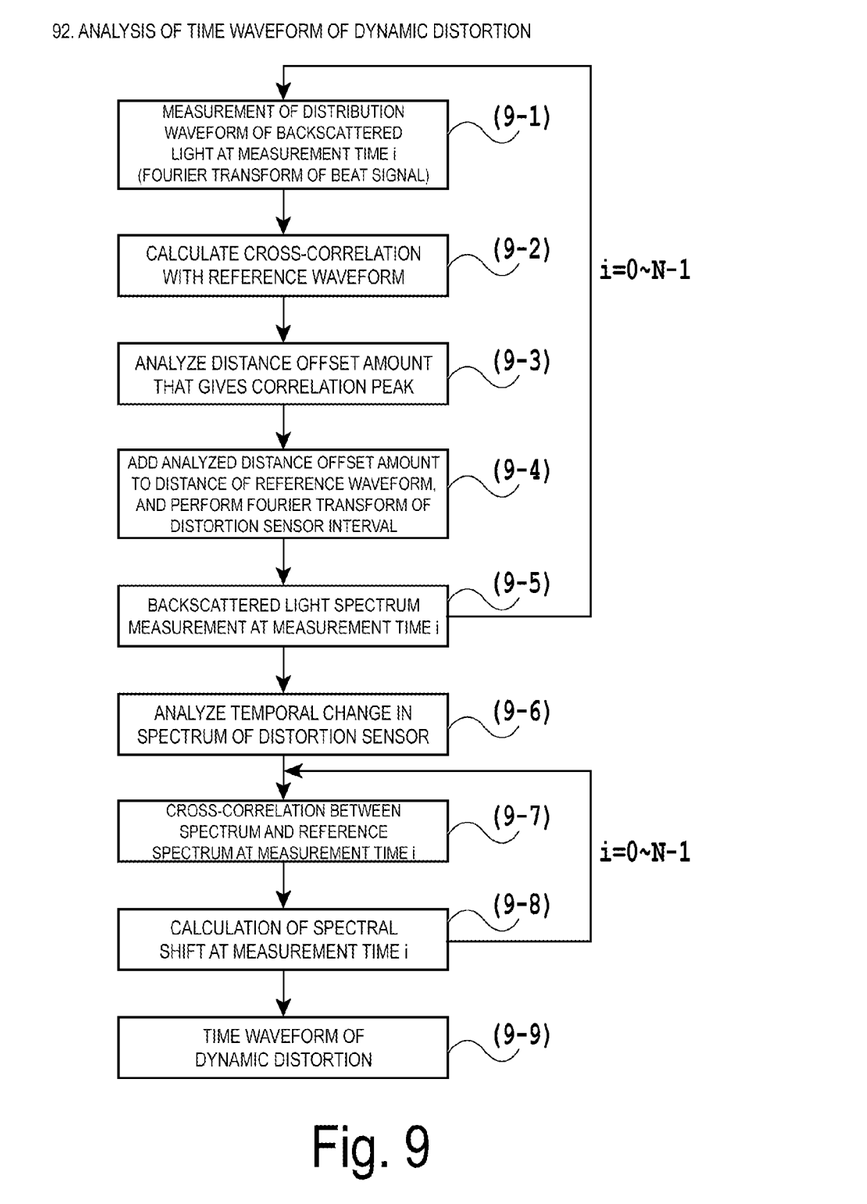
FIG. 9 is a flowchart illustrating a step of analyzing a time waveform of a dynamic distortion in the analysis method according to the embodiment of the present invention.

FIGS. 8 and 9 illustrate flowcharts of a step of analyzing the time waveform of the dynamic distortion in an analytical method according to the embodiment of the present invention.

Designation of Reference Waveform

FIG. 8 is a flowchart illustrating step 81 of designating the reference waveform which is a previous step in the analysis method according to the embodiment of the present invention.

In step (8-1), the distribution waveform of the backscattered light is measured (Fourier transform of the beat signal is performed).

In step (8-2), a distortion sensor interval is designated.

In step (8-3), the backscattered light spectrum of the designated distortion sensor interval is measured.

Analysis of Time Waveform of Dynamic Distortion

FIG. 9 is a flowchart of step 92 of analyzing the time waveform of the dynamic distortion in the analytical method according to the embodiment of the present invention. In the analysis step, first, the following steps (9-1) to (9-5) are repeated for N number of measurements at a measurement time i in which i is 0 to N−1. N in FIG. 9 is the number of repeated measurements of the OFDR (see FIG. 3).

(9-1) the distribution waveform of the backscattered light is measured at the measurement time i (Fourier transform of the beat signal is performed).

(9-2) the cross-correlation between the obtained distribution waveform and the reference waveform is calculated.

(9-3) a distance offset amount that gives the correlation peak of the cross-correlation is analyzed.

(9-4) the analyzed distance offset amount is added to the distance of the reference waveform, and Fourier transform of the decided distortion sensor interval is performed.

(9-5) the backscattered light spectrum at the measurement time i is measured.

After the aforementioned repetition step ends, the temporal change in the spectrum of the distortion sensor is analyzed in step (9-6).

Subsequently, the following steps (9-7) and (9-8) are repeated over N number of measurements at the measurement time i in which i is 0 to N−1.

(9-7) the cross-correlation between the spectrum and the reference spectrum at the measurement time i is obtained.

(9-8) the spectral shift at the measurement time i is calculated.

Ultimately, the time waveform of the dynamic distortion is obtained from the aforementioned result in step (9-9), and the procedure ends.

Although these steps are executed by a program on a computer constructing the analysis unit 11 of FIG. 1, the analysis unit 11 and the randomly selected collection data storage unit 10 of FIG. 1 may be arranged separately from the components 1 and 9 of FIG. 1, and may be connected via a network.

The measurement system and the analysis device according to the embodiment of the present embodiment can be realized by a computer and a program that execute the analysis method, and can also record a program in a recording medium and provide the program via the network.

Vibration Waveform Analysis Method and Vibration Waveform Analysis Device

As described above, a vibration waveform analysis method according to the present invention is a vibration waveform analysis method of, by a computer, analyzing a waveform of a vibration applied to a sensing fiber. The vibration waveform analysis method includes analyzing a distribution waveform of a beat signal obtained by mixing backscattered light from the sensing fiber as signal light with local light, the backscattered light being obtained by causing probe light to be incident on the sensing fiber, and the probe light and the local light are obtained by splitting the frequency sweep light. The method includes estimating a distance offset due to a vibration by using cross-correlation between the distribution waveform and a reference waveform, and correcting a distance to a vibration measurement interval, and obtaining the cross-correlation between a spectrum of the distribution waveform at a measurement time and a spectrum of the reference waveform, calculating a spectral shift at the measurement time, and obtaining the waveform of the vibration.

A vibration waveform analysis device according to the present invention is a vibration waveform analysis device that analyzes a waveform of a vibration applied to a sensing fiber. The vibration waveform analysis device analyzes a distribution waveform of a beat signal obtained by mixing backscattered light from the sensing fiber as signal light with local light, the backscattered light being obtained by causing probe light to be incident on the sensing fiber, and the probe light and the local light are obtained by splitting the frequency sweep light. The device includes a unit that estimates a distance offset due to a vibration by using cross-correlation between the distribution waveform and a reference waveform, and corrects a distance to a vibration measurement interval, and a unit that obtains the cross-correlation between a spectrum of the distribution waveform at a measurement time and a spectrum of the reference waveform, calculates a spectral shift at the measurement time, and obtains the waveform of the vibration.

The vibration distribution measurement system, the vibration waveform analysis method, and the vibration waveform analysis device according to the embodiment of the present invention have the following advantages over the related art.

In the related art 1, the frequency modulation due to the vibration is not considered, and the condition in which the vibration distribution measurement can be performed is not clarified. However, the condition in which the vibration distribution measurement can be performed is clarified in the embodiment of the present invention.

In the related art 2, the position and frequency of the dynamic distortion can be distributionally measured, but its magnitude cannot be measured and the time waveform of the dynamic distortion cannot be analyzed. A reference waveform in a non-vibration state is required to measure the distribution of the dynamic distortion. Meanwhile, in the embodiment of the present invention, the waveform in the vibration state can be used as the reference waveform by measuring the sensing fiber at the measurement time shorter than the minimum cycle of the plurality of dynamic distortions applied to the sensing fiber. The magnitude, frequency, and position of the dynamic distortion can be measured, and the time waveform of the dynamic distortion can be analyzed. This is a significant advantage in the case of a target to be currently measured for which it is difficult to ensure the non-vibration state.

In the embodiment of the present invention, a change in the distance of the distortion sensor due to the frequency modulation caused by the vibration can be corrected. Thus, it is possible to perform the measurement while associating the time waveform of each of the plurality of vibrations applied to a plurality of different positions of the sensing fiber to the correct position that has actually been applied, and it is possible to greatly improve the measurement accuracy.

INDUSTRIAL APPLICABILITY

As described above, according to the embodiment of the present invention, it is possible to provide a vibration distribution measurement system, a vibration waveform analysis method, a vibration waveform analysis device, and a program capable of measuring a distribution of a time waveform of a dynamic distortion in consideration of influence of a frequency modulation in a dynamic distortion distribution measurement based on OFDR.

REFERENCE SIGNS LIST 11 frequency sweep light source
12 trigger source
13 trigger signal splitter
14 optical splitter
15 optical circulator
16 sensing fiber
17 optical mixer
18 balanced optical receiver
19 A/D converter
20 collection data storage unit
21 analysis unit
22 first dynamic distortion interval
23 second dynamic distortion interval

The invention claimed is:

1. A vibration distribution measurement system for measuring a distribution of a vibration applied to a sensing fiber, the system comprising:
   a frequency sweep light source configured to output frequency sweep light;
   an optical splitter configured to split the frequency sweep light into probe light and local light;
   an optical mixer configured to mix backscattered light from the sensing fiber as signal light with the local light, the backscattered light being obtained by causing the probe light to be incident on the sensing fiber; and
   an analysis unit comprising a processor, the analysis unit configured to analyze a beat signal obtained from output light of the optical mixer,
   wherein the analysis unit estimates a distance offset from a measurement result obtained from a distribution waveform of the beat signal by measuring the beat signal at a measurement time sufficiently shorter than a cycle of the vibration at the sensing fiber, and measures a distribution of a vibration at any position by using the distance offset
   wherein the distribution waveform is an electric field waveform at each distortion measurement interval defined from a light incident end and obtained by Fourier transforming the beat signal from the sensing fiber.

2. The vibration distribution measurement system according to claim 1,
   wherein the analysis unit estimates the distance offset due to the vibration by using cross-correlation between the distribution waveform and a reference waveform, and corrects a distance of a distortion measurement interval.

3. The vibration distribution measurement system according to claim 2,
   wherein a distribution waveform of the sensing fiber in a vibration state is used as the reference waveform for a vibration having a cycle longer than a frequency sweep time of the frequency sweep light.

4. The vibration distribution measurement system of claim 1, wherein the distance offset represents fluctuation of a distance from the light incident end to the distortion measurement interval due to the vibration, and being calculated from a frequency offset, the frequency offset being from a peak of autocorrelation in a reference waveform to a peak of a cross-correlation between the distribution waveform and the reference waveform; and
   the reference waveform is one of the distribution waveforms within the distortion measurement interval to be measured.

5. A vibration waveform analysis method of, by a computer, analyzing a waveform of a vibration applied to a sensing fiber, the method including analyzing a distribution waveform of a beat signal obtained by mixing backscattered light from the sensing fiber as signal light with local light, the backscattered light being obtained by causing probe light to be incident on the sensing fiber, the probe light and the local light being obtained by splitting frequency sweep light, the method comprising:
   estimating a distance offset due to a vibration by using cross-correlation between the distribution waveform and a reference waveform, and correcting a distance from a light incident end to a vibration measurement interval,
   wherein the distribution waveform is an electric field waveform at each vibration measurement interval and obtained by Fourier transforming the beat signal from the sensing fiber;
   obtaining a frequency offset to calculate the distance offset at a measurement time, the frequency offset being from a peak of autocorrelation in the reference waveform to a peak of the cross-correlation between the distribution waveform and the reference waveform; and
   obtaining the waveform of the vibration based on the distance corrected by the distance offset.

6. An analysis program causing a computer to execute the vibration waveform analysis method described in claim 5.

7. The vibration waveform analysis method of claim 5, wherein the reference waveform is one of the distribution waveforms within the vibration measurement interval to be measured; and
   the distance offset represents fluctuation of the distance from the light incident end to the vibration measurement interval due to the vibration.

8. A vibration waveform analysis device for analyzing a waveform of a vibration applied to a sensing fiber, the device analyzing a distribution waveform of a beat signal obtained by mixing backscattered light from the sensing fiber as signal light with local light, the backscattered light being obtained by causing probe light to be incident on the sensing fiber, and the probe light and the local light being obtained by splitting frequency sweep light, the device comprising:
- a processor configured to estimate a distance offset due to a vibration by using cross-correlation between the distribution waveform and a reference waveform, and correct a distance from a light incident end to a vibration measurement interval;
- wherein the distribution waveform is an electric field waveform at each vibration measurement interval and obtained by Fourier transforming the beat signal from the sensing fiber;
- the processor further configured to obtain a frequency offset to calculate the distance offset at a measurement time, the frequency offset being from a peak of auto-correlation in the reference waveform to a peak of the cross-correlation between the distribution waveform and the reference waveform; and
- obtain the waveform of the vibration based on the distance corrected by the distance offset.

* * * * *